Figure 1:
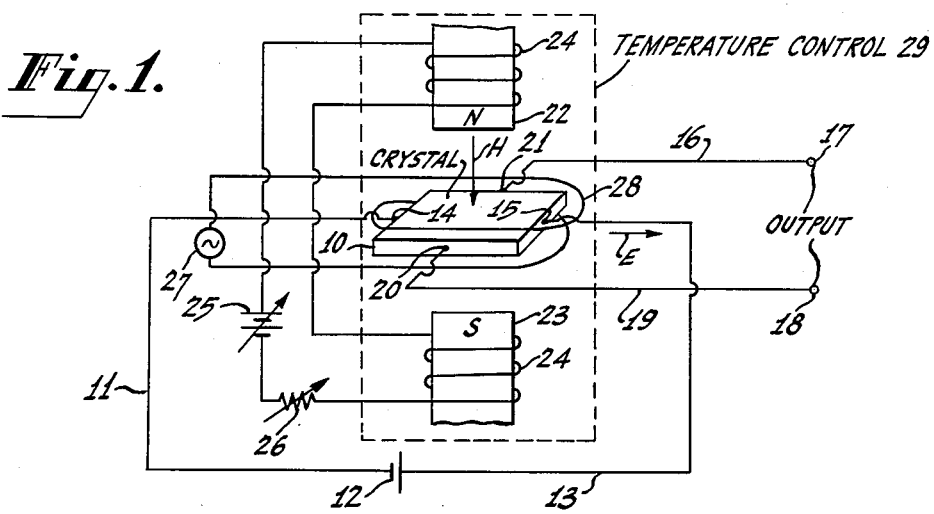

INVENTORS
MARTIN C. STEELE &
MAURICE GLICKSMAN

BY Charles H. Brown
ATTORNEY

INVENTORS
MARTIN C. STEELE &
MAURICE GLICKSMAN
BY Charles H. Brown
ATTORNEY

United States Patent Office 3,010,034
Patented Nov. 21, 1961

3,010,034
FREQUENCY MULTIPLIER
Martin C. Steele and Maurice Glicksman, Princeton, N.J., assignors to Radio Corporation of America, a corporation of Delaware
Filed Oct. 31, 1958, Ser. No. 771,109
10 Claims. (Cl. 307—88.5)

This invention relates to frequency multipliers. Particularly, the invention relates to a circuit arrangement in which the magneto-oscillatory behavior exhibited by many materials at low temperatures is used to construct a frequency multiplier capable of multiplying a given frequency by any one of a wide range of integral factors.

It is known that at low temperatures the magnetic susceptibility of many materials in crystal form shows oscillations which are periodic in the reciprocal of the magnetic field intensity. This phenomenon is referred to as the De Haas-Van Alphen effect. It has also been shown that the Hall effect or coefficient in these materials is also periodic in the reciprocal of the magnetic field intensity. The oscillations are related, in theory, to the quantization of the electron's motion in the plane perpendicular to the magnetic field. Examples of metals showing such oscillations are mercury, tin, zinc and thallium. Semiconductor materials exhibiting the oscillations are indium antimonide and indium arsenide. Semi-metals such as graphite, bismuth and antimony have also been shown to exhibit the oscillations.

A discussion of this periodicity of the Hall effect can be found in such references as "Low-Temperature Galvanomagnetic Effects in Bismuth Monocrystals" by R. A. Connell and J. A. Marcus, The Physical Review, vol. 107, No. 4, pages 940–946; "Galvanomagnetic Effects in n-Type Indium Antimonide" by H. P. R. Frederikse and W. R. Hosler, The Physical Review, vol. 108, No. 5, pages 1136–1145; "Oscillatory Galvanomagnetic Properties of Antimony Single Crystals at Liquid Helium Temperatures" by M. C. Steele, The Physical Review, vol. 99, No. 6, pages 1751–1759, and so on.

It is an object of the invention to provide a novel frequency multiplier by the use of the magneto-oscillatory behavior exhibited by certain materials at low temperatures.

Another object is to provide an improved frequency multiplier which is capable of multiplying a given frequency by any one of a wide range of factors without requiring tuned circuits or other frequency tuning means for its operation.

Another object is to provide a novel frequency multiplier including a crystal of a material exhibiting a periodicity of the Hall effect in the reciprocal of the magnetic field intensity at low temperatures to translate a signal of given frequency in a range of frequencies into an output signal of the given frequency multiplied by a desired integral factor, without requiring a retuning of the frequency multiplier upon a change in the frequency of the input signal.

Another object is to provide a novel frequency multiplier including a single crystal operated upon to perform the frequency multiplication, the multiplication factor being determined by means external to the crystal.

A further object is to provide an improved frequency multiplier which is simple in operation and construction, requiring a minimum number of parts.

In accordance with the objects of the invention, a crystal body is provided constructed of a material exhibiting periodicity of the Hall effect in the reciprocal of the intensity of a magnetic field applied to the material at low temperatures. A constant electric field of sufficient intensity to provide a path for the movement of mobile electric charge carriers through the crystal is applied across one axis of the crystal. A magnetic field is applied across a second axis of the crystal perpendicular to the axis of the electric field. Means are provided for deriving an output signal represented by the Hall voltage from across a third axis of the crystal perpendicular to the axis of the magnetic field and to the axis of the electric field. Suitable apparatus is provided for maintaining the crystal at low temperatures in the order of liquid helium temperature.

As described in the above-mentioned references and elsewhere in the art, the periods of the Hall effect oscillations produced in the crystal by the operation of the above structure are dependent upon the particular orientation of the magnetic field with respect to the axes of the crystal and upon the crystal material used. In accordance with the invention, the magnetic field is varied at a given frequency rate. The intensity of the magnetic field along with the average level thereof are determined so that a given sequence of periods of the Hall effect oscillations occur during each cyclical swing of the magnetic field, the given sequence of periods of the Hall effect oscillations being determined according to the multiplication factor desired. By this action, an output signal represented by the Hall voltage is derived from the crystal having a frequency which is equal to the frequency at which the magnetic field is varied multiplied by this desired factor.

A frequency multiplier is provided which functions without tuned circuits and similar frequency determining circuitry, thus avoiding the difficulties and disadvantages normally encountered in the use of such circuits. The multiplication factor can be changed external to the crystal by varying the intensity and/or the average level of the magnetic field, thus varying the cyclical swing of the magnetic field with respect to the periods of the Hall effect oscillations and therefore the sequence of the periods of the Hall effect oscillations occurring during each cyclical swing.

A more detailed description of the invention will now be given with reference to the accompanying drawing in which:

FIGURE 1 is a circuit diagram of one embodiment of a frequency multiplier constructed according to the invention; and FIGURES 2, 3, 4, 5, 6, 7, 8, 9 and 10 are curves useful in describing the operation of the embodiment of the invention given in FIGURE 1. Numbers are provided along the abscissa of the curves for reference purposes only and are not to be considered as actual magnetic field values.

In the embodiment of the invention given in FIGURE 1, there is shown a crystal 10 constructed of a material capable of operation as a Hall effect element. Particularly, the crystal 10 is a crystal constructed of a material which exhibits a periodicity of the Hall effect in the reciprocal of a magnetic field at low temperatures. The crystal 10 may be constructed of any one of the metals, semi-metals or semiconductor materials given by way of example above and may be cut from a single grown crystal of high purity using known procedures and techniques.

The crystal 10 may be of any shape and size according to the requirements of a particular application. While the crystal 10 is shown and will be described as being rectangular in shape, it is to be understood that the crystal 10 may be of any other suitable shape as, for example, square or cubic. By way of example only, the crystal 10 may be one millimeter wide by one millimeter thick by four millimeters in length. The actual size depends on the shape of the crystal 10, the material used, and so on.

A first electrical path including lead 11, a source of constant unidirectional potential represented by a battery 12 and a lead 13 is connected in series with the length of the crystal 10. As shown in FIGURE 1, the leads 11 and 13 are connected to opposite ends of the crystal 10 at points 14, 15 located along the long dimension or the longitudinal axis thereof by any of known techniques. The contacts at the points 14, 15 may be made, for example, by soldering to the crystal 10 or to deposited material coatings on the crystal 10. The electric potential E applied to the crystal 10 by the battery 12 is determined to be of a value sufficient to provide a conduction path for the mobile electric charge carriers through the crystal 10 in the direction of the electric potential. The electric potential may be in the order of one millivolt or less depending upon the material used for the crystal 10, the output level desired, and so on. A second electric path or output circuit including lead 16, terminals 17, 18 and lead 19 is connected across the width of the crystal 10 at right angles to the first electrical path defined above. The leads 16 and 19 are connected to the crystal 10 at points 20, 21 by the same techniques used to connect leads 11 and 13 to the crystal 10.

The crystal 10 is located by any suitable means in the air gap between the faces of a pair of magnetic pole pieces 22, 23. A winding 24 is located on the pole pieces 22, 23. A source of unidirectional potential shown as a variable battery 25 and a variable resistor 26 are connected in series with the winding 24 and function to determine the intensity of the biasing magnetic field H supplied by the magnetic pole pieces 22, 23 to the crystal 10 in the direction indicated by the arrow. A further electrical path is provided including a source 27 of alternating current signal energy connected to a single turn winding 28, the crystal 10 being positioned within the single turn of the winding 28. The winding 28 is set so that the magnetic field applied to the crystal 10 thereby is in the same direction as the biasing magnetic field applied to the crystal 10 by the operation of pole pieces 22, 23. In this manner, a biasing magnetic field is provided having an intensity determined by the battery 25, resistor 26 and winding 24, the intensity of the total magnetic field applied to the crystal 10 being varied according to the alternating current signal energy supplied by the source 27 and the winding 28. While one arrangement for applying a magnetic field to the crystal 10 is shown in FIGURE 1, any suitable arrangement may be used. For example, the source 27 may be connected to suitable driving means on the pole pieces 22, 23 so as to vary the biasing magnetic field at the alternating current signal frequency rate.

The crystal 10 is located in a low temperature environment indicated schematically by a dashed box 29. The box may represent a liquid helium cryostat or other means for maintaining the crystal 10 at a low temperature. Liquid helium liquifiers are commercially available as are double Dewar flasks which use liquid nitrogen in the outer Dewar and liquid helium in the inner Dewar, and lose less than 1% of the liquid helium per day. The temperature control device 29 is designed to maintain the crystal 10 at a temperature, for example, in the order of 4.2 Kelvin, although lower temperatures may be employed. It is believed to be unnecessary to discuss in detail the means for maintaining the crystal 10 at low temperatures. These are described, in general, in an article entitled "Low Temperature Electronics" in the Proceedings of the IRE, vol. 42, pages 408, 412, February 1954, and other publications.

It is known that certain materials have a property by which an electrical potential is produced at laterally spaced points along one axis of the material when a current is passed through an orthogonal axis thereof under the influence of a mutually orthogonal magnetic field. This electrical property is referred to as the Hall effect. The output or Hall voltage produced at the laterally spaced points is generally proportional to the product of the magnetic field strength and the intensity of the current passed through the material or Hall effect element. As reported in the above-mentioned articles and elsewhere, it is also known that certain of these materials exhibit a periodicity (or oscillations) of the Hall effect in the reciprocal of the magnetic field at low temperatures. Experimental results have shown that the periodicity of the Hall effect is a function of the material used and the particular orientation of the magnetic field relative to the axes of the material. The periodicity of the Hall effect is different for each material, and, in the use of one of the materials, differs according to the orientation of the magnetic field relative to the crystal axes of that material.

In describing the operation of the invention, it will be assumed that the crystal 10 has been cut from a single crystal of bismuth. It is to be understood, however, that the operation of the invention to be described applies equally well to other applications wherein any one of the other metals, semi-metals or semiconductor materials exhibiting these oscillatory effects, some of which were given by way of example above are selected for use. Since bismuth is a rhombohedral crystal, there are three principal crystallographic orientations for both the electric field and magnetic field; parallel to the trigonal axis, parallel to a binary axis, or perpendicular to the plane formed by the trigonal axis and a binary axis. Limiting the discussion to transverse galvanomagnetic effects, where the current, magnetic field and Hall field are mutually perpendicular, it is found that there are six primary crystal orientations. The crystal 10 will exhibit a periodicity of the Hall effect according to the particular crystal orientation used. The results obtained for the different crystal orientations are reported by way of example in the above-mentioned article entitled "Low-Temperature Galvanomagnetic Effects in Bismuth Monocrystals." Further results using bismuth for the crystal 10 are reported in an article entitled "Hall Effect in Bismuth at Low Temperatures" by J. M. Reynolds, H. W. Hemstreet, T. E. Leinhardt and D. D. Triantos, The Physical Review, vol. 96, No. 5, pages 1203–1207.

For purposes of the present discussion, it will be assumed that the biasing magnetic field provided by the electromagnetic arrangement including pole pieces 22, 23 and winding 24 is oriented so as to be perpendicular to the trigonal axis of the bismuth crystal 10. The magnetic field applied to the crystal 10 may be of a value in the order of several thousand gauss. The temperature control device 29 is set to maintain the crystal 10 at a temperature, for example, of 4.2 Kelvin. The source 27 is assumed for the moment to provide zero signal energy to the winding 28. A typical curve showing the Hall effect or coefficient $R_H$ versus the reciprocal of the magnetic field for bismuth is given in FIGURE 2. As shown, the Hall coefficient $R_H$ is a periodic function of the reciprocal of the biasing magnetic field H.

Figure 2:
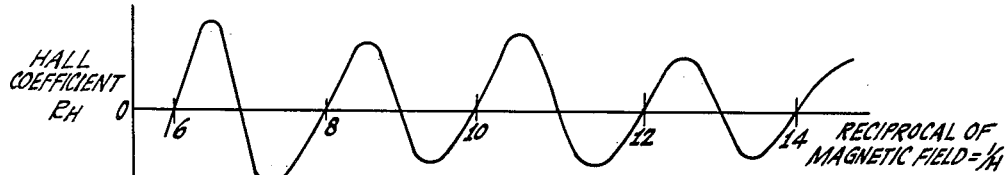

The Hall coefficient $R_H$ is shown in the curve of FIGURE 2 to oscillate about an essentially zero mean value as the biasing magnetic field supplied via the operation of pole pieces 22, 23 is increased. In practice, a crystal 10 may be used in which the Hall coefficient oscillations are found to be completely negative or completely positive rather than having a zero mean value as shown for the oscillations depicted in FIGURE 2. It is believed that the occurrence of the oscillations of the Hall coefficient about zero mean value is due to the presence of a relatively small concentration of impurities in the bismuth crystal used as an example. By the addition of such impurities, the conductivity of the crystal 10 can be altered sufficiently such that the Hall coefficient oscillations have a zero mean value as shown in the curve of FIGURE 2. The proper doping can be determined by using known procedures and techniques. Since there are available in the art a number of references describing procedures for doping and otherwise determining the conductivity of a crystal body, a detailed description is believed to be unnecessary. By way of example, one discussion of the procedures involved in doping semiconducting crystals to change the conductivity thereof may be found in "Electrons and Holes in Semi-Conductors," by Shockley, published by Van Nostrand Company.

In any case, it will be assumed that the crystal 10 has been prepared following the procedures outlined above such that the Hall coefficient oscillations appear as shown in the curve of FIGURE 2. As shown, the Hall coefficient $R_H$ actually goes from negative to positive values and back again relative to the reciprocal of the magnetic field $1/H$ as the magnetic field H is varied. By simple mathematics, the curve for the Hall coefficient $R_H$ versus the magnetic field H can be drawn from the data given in FIGURE 2, and the resulting curve is given in FIGURE 3, where $R_H$ is plotted as a function of the absolute value of H.

Figure 3:
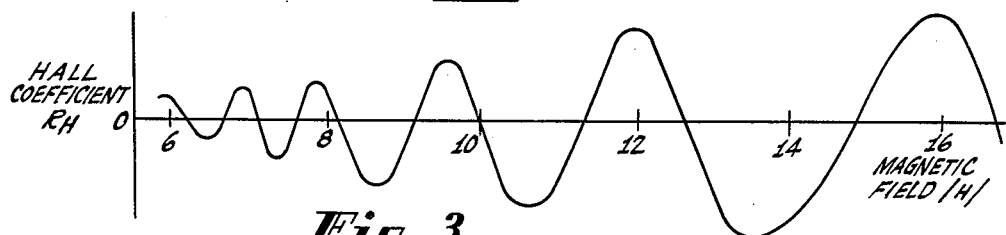
Figure 4:
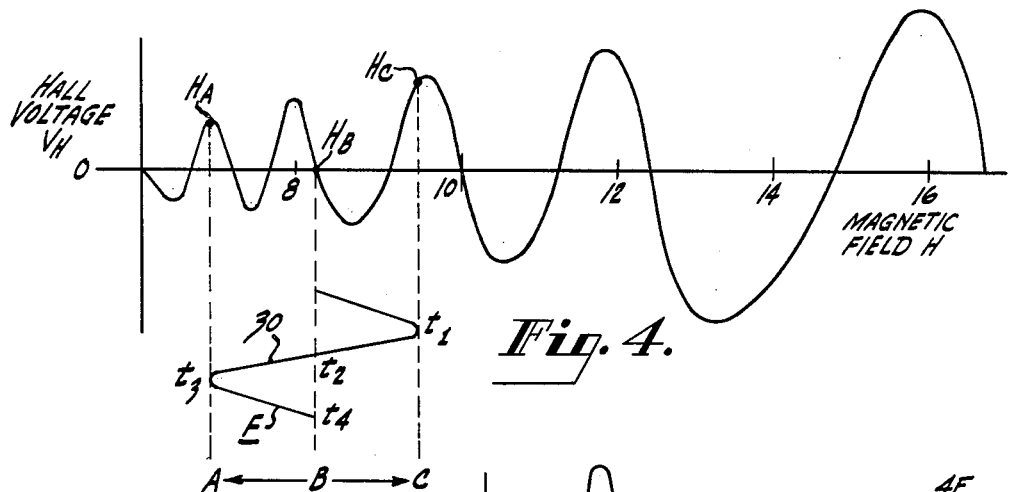

It is to be noted that the Hall coefficient $R_H$ has the same value for magnetic fields of $+H$ and $-H$. Assuming a constant current supplied by the battery 12 and Hall coefficient oscillations as shown in the curve of FIGURE 3, the Hall voltage $V_H$ appearing at terminals 17, 18 across the Hall effect axis of the crystal 10 is as shown in FIGURE 4, where the Hall voltage $V_H$ is plotted versus the magnetic field H. The important point is that the Hall voltage $V_H$ oscillates through zero as a function of the magnetic field H.

It has been assumed up to this point in the discussion that the source 27 is set to supply a zero signal energy to the winding 28. The curves given in FIGURES 2, 3, and 4 are drawn on the basis of a change in the biasing magnetic field supplied by pole pieces 22, 23 through the operation of battery 25, resistor 26 and winding 24. Let it be assumed that a signal of frequency F supplied by source 27 is to be multiplied by a factor of four. As shown in FIGURE 4, the biasing magnetic field is set by the proper adjustment of battery 25 and resistor 26 to be of constant value $H_B$. The source 27 is then operated to apply the signal 30 of frequency F to the winding 28. The intensity or amplitude of the signal supplied to the winding 28 is determined so that the total magnetic field applied to the crystal 10 varies between two values of the magnetic field $H_A$ and $H_C$ in the manner shown in FIGURE 4. The resulting Hall voltage or output signal of frequency 4F applied to the terminals 17, 18 of the frequency multiplier is shown in FIGURE 5.

At the start of each cycle of the signal 30, the magnetic field H equals the value $H_B$ and the Hall voltage $V_H$ equals zero in the manner shown in FIGURE 4. As the signal 30 goes positive, the Hall voltage $V_H$ appearing at terminals 17, 18 goes negative and then positive through zero until the upper limit $H_C$ of the magnetic field H is reached at time $t_1$, as shown in FIGURE 5. The signal 30 then decreases causing the magnetic field H to return to the value $H_B$ at time $t_2$. The Hall voltage $V_H$ reverses such that it goes negative through zero and then positive until it again equals zero at the value $H_B$ of the magnetic field. Thereafter, the signal 30 goes negative, causing the magnetic field H to decrease to the lower limit $H_A$ thereof at time $t_3$. The Hall voltage $V_H$ goes positive, then negative through zero, and then positive through zero until the value $H_A$ of the magnetic field H is reached. The signal 30 then returns to the reference or mean level thereof, completing a cycle at time $t_4$. The Hall voltage $V_H$ reverses such that it goes negative through zero, then positive through zero and then returns to zero at the value $H_B$ of the magnetic field H. Each cycle of the signal 30 supplied by source 27 results in a change in the Hall voltage $V_H$ as described above and shown in FIGURE 5.

Figure 5:
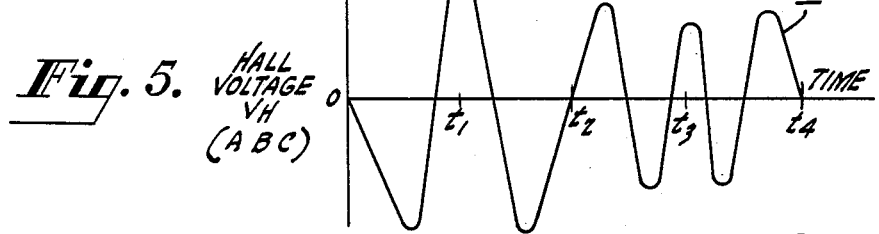

As shown in FIGURE 5, for each cycle of the signal 30, four cycles will appear in the Hall voltage $V_H$ at the output terminals 17, 18. A frequency multiplier is thus provided capable of multiplying the frequency F of the signal 30 supplied by the source 27 by a factor of four. Assuming that the amplitude of the signal supplied by the source 27 remains the same as that of the signal 30 and, therefore, the magnetic field H is held at the limits $H_A$ and $H_C$ for each cyclical swing thereof, the frequency multiplier arranged and operated in the manner described in connection with FIGURES 4 and 5 will always function to produce at its output a signal having a frequency four times the frequency of the signal supplied by the source 27. The frequency of the signal supplied by the source 27 may be changed from the frequency F to a new frequency, and the frequency multiplier without further adjustment will produce at its output a signal having a frequency four times the new frequency of the signal, and so on. This is true since, as shown in FIGURE 4, the operation of the frequency multiplier is not a function of the frequency of the input signal. However, it is to be understood that the upper operating frequency of the frequency multiplier of the invention is limited by the relaxation time for scattering in the crystal. This frequency limitation corresponds to about $10^{10}$ cycles per second. At the high frequencies, the dimensions of the crystal must be determined so as to properly account for high frequency normal and anomalous skin effects. No tuned circuits are used, the frequency multiplication being accomplished within the crystal 10 by the proper selection of the periods of the Hall voltage oscillations through which the magnetic field H is varied at the input frequency rate.

Figure 6:
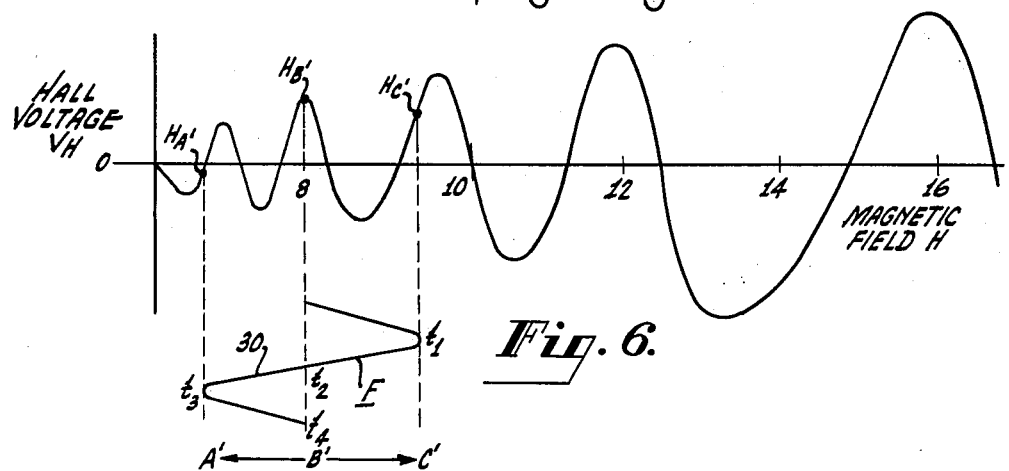

Let it now be assumed that the source 27 continues to supply the signal 30 of frequency F but that it is desired to provide a multiplication factor of five. No adjustment is made in the source 27, and the signal supplied thereby to winding 28 continues at the same intensity and frequency F as in the embodiment shown in FIGURE 4. As shown in FIGURE 6, the biasing magnetic field H is changed by adjustment of battery 25 and/or resistor 26 to a value $H_B'$. Since the intensity or swing of the signal 30 is assumed to remain the same, the limits of the cyclical swing of each cycle of the magnetic field H now become $H_A'$ and $H_C'$. The cyclical swing of the magnetic field H by the signal 30 supplied to the winding 28 occurs over a new sequence of periods of the Hall voltage oscillations.

Figure 7:
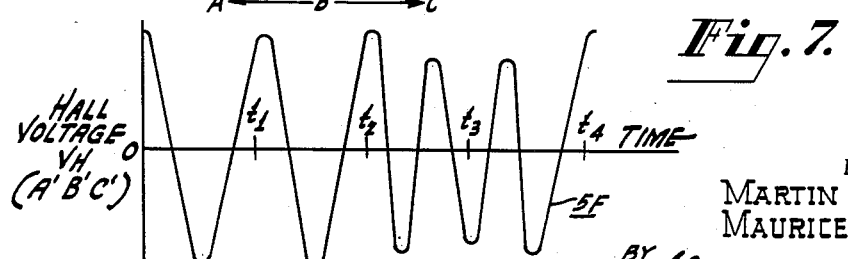

FIGURE 7 shows the resulting Hall voltage $V_H$ or output signal in relation to time appearing at the terminals 17, 18 of the frequency multiplier. At the start of each cycle of signal 30, the Hall voltage $V_H$ is positive. As the signal 30 goes positive, the Hall voltage $V_H$ goes negative through zero and then positive thru zero until the upper limit $H_C'$ of the magnetic field H is reached at time $t_1$. As the signal 30 decreases, the Hall voltage $V_H$ reverses. The Hall voltage $V_H$ goes negative thru zero and then positive thru zero until the magnetic field H is again at the bias value $H_B'$ at time $t_2$. The signal 30 thereafter goes negative. The Hall voltage $V_H$ goes negative thru zero, positive thru zero and then negative thru zero until the magnetic field H reaches its lower limit $H_A'$ at time $t_3$. The signal 30 then returns to its reference level at time $t_4$. The Hall voltage $V_H$ reverses such that it goes positive thru zero, negative thru zero and then positive thru zero until the magnetic field H again equals the mean value $H_B'$, and so on. The Hall voltage $V_H$ will appear as shown in FIGURE 7 for each cycle of the signal 30.

Five cycles of the Hall voltage $V_H$ or output signal occur for each cycle of the signal 30. A frequency multiplier is thus provided capable of multiplying an input signal frequency by a factor of five. As long as the signal supplied by source 27 remains of constant intensity or amplitude, the frequency multiplier will produce an output signal having the frequency of the signal supplied by source 27 multiplied by a factor five. No adjustment or returning of the frequency multiplier is required should the frequency of the signal supplied by source 27 be changed to a new value. With the setting of the biasing magnetic field shown in FIGURE 6, the frequency multiplier will always produce an output signal at terminals 17, 18 having a frequency five times the frequency of the signal supplied by source 27.

It follows from the above discussion that, assuming the intensity of the signal supplied by source 27 remains at the same value as shown in FIGURES 4 and 6, other factors of multiplication can be obtained by merely adjusting the biasing magnetic field to a new value corresponding to the multiplication factor desired. By setting the mean value $H_B$ of the cyclical swing of the magnetic field at the proper point on the curve of the Hall voltage oscillations, the desired multiplication factor can be obtained. The frequency of the signal supplied by source 27 may be set at any frequency in the direct current to several megacycle range, and the frequency multiplier will produce an output signal having the frequency of the signal times the multiplication factor determined according to the setting of the magnetic field limits. The multiplication factor can be changed by merely altering the sequence of the periods of the Hall voltage oscillations through which the magnetic field H is swung. It may be seen that the phase of the output signal of the frequency multiplier as shown in FIGURE 7 can be varied by changing the bias magnetic field $H_B'$ within specified limits determined from the curve of FIGURE 6 without altering the multiplication factor.

Figure 8:
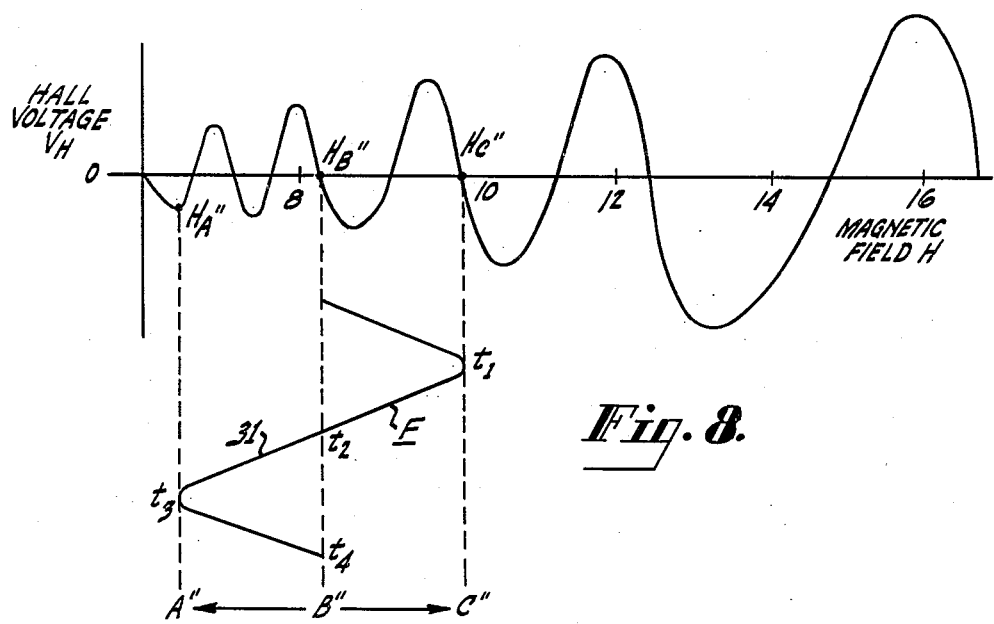
Figure 9:
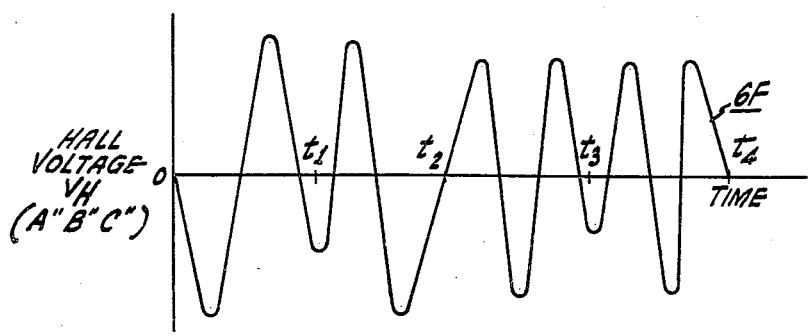

FIGURES 8 and 9 illustrate a second way of determining the multiplication factor obtained by the frequency multiplier of the invention. In describing the embodiments of the invention shown in the curves of FIGURES 4 and 6, it was assumed that the intensity of the signal supplied by the source 27 was not changed upon a change in the multiplication factor. The multiplication factor was determined by varying the setting of the biasing magnetic field so as to locate the mean value $H_B$ of the swinging magnetic field at the proper point on the curve of the Hall voltage oscillations to achieve the multiplication factor desired. In the embodiment of the invention shown in FIGURES 8 and 9, the biasing magnetic field is set at a given value $H_B''$ and is not changed. A change in the multiplication factor is accomplished by changing the intensity of the signal supplied by the source 27.

Let it be assumed that the biasing magnetic field is set at the value $H_B''$ as shown in FIGURE 8. This setting corresponds to the setting $H_B$ of the biasing magnetic field in the embodiment of FIGURE 4, where a multiplication factor of four was obtained. Instead of having the limits $H_A$ and $H_C$, however, the intensity of the signal 31 supplied by the source 27 is increased to have the limits $H_A''$ and $H_C''$. Following the same reasoning as presented in connection with FIGURES 4 and 6, it follows that for each cycle of the signal 31 supplied by the source 27, six cycles of the Hall voltage $V_H$ appear at the output terminals 17, 18 in the manner shown in FIGURE 9. For any frequency of the input signal 31 supplied by the source 27, assuming that the intensity of the signal remains the same as shown in FIGURE 8, the frequency multiplier produces an output signal having a frequency equal to the frequency of the signal multiplied by a factor of six. It follows that by changing the intensity of the signal 31 supplied by the source 27 so that the cyclical swing of the magnetic field H occurs over a different sequence of periods of the Hall voltage oscillations, correspondingly different multiplication factors are obtained in the operation of the frequency multiplier.

Reference has been made to the case where the Hall effect oscillations may be found to be completely negative or completely positive rather than having a zero mean value. It was described how the Hall effect oscillations can be made to have a zero mean value by properly doping the crystal. Another approach is to properly bias the connections 20, 21 or Hall probes with a signal proportional to the non-oscillatory component of the Hall voltage $V_H$. In this manner, the voltage difference between $V_H$ and the biasing voltage can be made to have a zero mean value, and the operation will be as described above. The important point is that the Hall voltage $V_H$ or the difference between $V_H$ and a biasing voltage goes through zero as a function of the magnetic field H.

Figure 10:
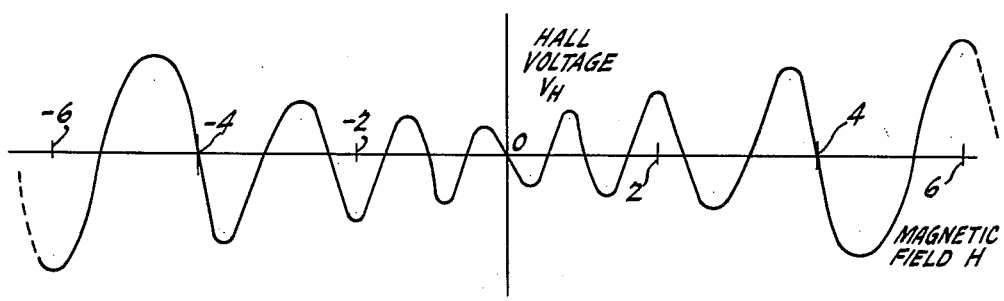

In describing the invention, the magnetic field has been shown as swinging between positive values. The invention is not limited to this arrangement. The magnetic field may be made to swing between negative and positive values. As shown in FIGURE 10, as the magnetic field H assumes a negative value, the Hall voltage $V_H$ which is proportional to the direction of the electric field and the direction of the magnetic field changes sign. As mentioned above in connection with FIGURE 3, the Hall coefficient $R_H$ has the same value for $+H$ and $-H$. Therefore, the Hall voltage oscillations occurring when the magnetic field assumes negative values are identical to the oscillations when the magnetic field assumes positive values but are of opposite sign. The magnetic field H can be set so that the cyclical swing thereof has a mean value of zero. One-half cycle swings through positive values, while the other half cycle swing through negative values. The intensity of the swing can be determined to provide the desired multiplication factor in the manner described above. The limits of the magnetic field swing can be set so that the magnetic field assumes a negative value for only a portion of one-half cycle, and so on. Further, the signal input has been assumed to be such that the swing of the magnetic field is symmetrical. In practice, a signal input may be used such that the swing of the magnetic field is asymmetrical, the mean value $H_B$ about which the magnetic field swings and the limits of the swing being set by the proper adjustment of the biasing magnetic field and the intensity of the input signal to provide the desired multiplication factor.

A frequency multiplier is provided by the invention which is highly versatile in operation. In the operation of the invention, the range of multiplication factors available is limited only by the periodicity of the Hall effect oscillations. In operation, a material is chosen from the group exhibiting the periodicity of the Hall effect, and the magnetic field is oriented relative to the crystalline axes of the material to produce the most desirable Hall effect oscillations in accordance with the particular multiplication factor or range of multiplication factors desired. The periodicity of the Hall effect oscillations exhibited determine what value of magnetic field to use for a particular multiplication factor as described above. The periods of the Hall effect oscillations fix the desired magnetic field setting.

A feature of the invention is that no tuned circuits or similar circuitry are involved in the operation thereof. Once the multiplier is set in the manner described to perform a given multiplication of the input signal frequency, it continues to provide the given multiplication regardless of any change in the input signal frequency. No retuning of the multiplier is required upon a change in the input signal frequency. The multiplication factor obtained is changed by a simple adjustment of either the value of the magnetic field H or of the input signal intensity. The adjustments are all external to the crystal, and the invention is to be distinguished from arrangements in which the operation is controlled by altering a condition such as the concentration of mobile charge carriers within a crystal body. A frequency multiplier which is both simple in operation and in construction is presented. A frequency multiplier is provided capable of operation into the microwave frequency range and is useful as a signal generator, in computers based on a time basis, in multiplexing apparatus, and so on.

What is claimed is:
1. A frequency multiplier comprising a crystal arranged and operated to exhibit Hall effect oscillations in the reciprocal of an applied varying magnetic field in- tensity at low temperatures, means to apply a varying magnetic field to said crystal and for determining the intensity and mean value of each cyclical swing of the magnetic field so that a given sequence of the Hall effect oscillations occurs during each cyclical swing of the magnetic field, and means for deriving from said crystal an output signal having a frequency equal to the frequency at which the magnetic field is varied multiplied by an integral factor, the integral factor depending upon said given sequence of Hall effect oscillations.

2. A frequency multiplier comprising a single crystal arranged and operated to exhibit across an axis thereof Hall effect oscillations with a zero mean value in the reciprocal of an applied magnetic field intensity at a low temperature in the order of liquid helium temperatures, means to apply a magnetic field varying at an alternating frequency rate to said crystal and for determining the limits and mean value of each cyclical swing of said magnetic field so that a given sequence of the Hall effect oscillations occurs during each cyclical swing of the magnetic field, and means to derive from across said axis of said crystal an output signal having a frequency equal to said frequency rate multiplied by an integral factor, the integral factor depending upon said given sequence of Hall effect oscillations.

3. A frequency multiplier comprising a crystal body constructed of a material exhibiting Hall effect oscillations with a zero mean value in the reciprocal of an applied magnetic field at low temperatures, means to apply an electric potential across an axis of said crystal body, means to maintain said crystal body at a low temperature, means to apply a magnetic field varying at an alternating current input frequency rate and oriented in a given manner with respect to the crystalline axes of said crystal body across the second axis of said crystal body perpendicular to said first axis thereof, the magnetic field being oriented with respect to the crystalline axes and the limits and mean value of each cyclical swing of the magnetic field being determined so that a given sequence of the Hall effect oscillations occurs during each cyclical swing of the magnetic field, and means for deriving from across a third axis of said crystal body perpendicular to said first axis and to said second axis an output signal having a frequency equal to said input frequency rate multiplied by an integral factor, the integral factor depending upon said given sequence of Hall effect oscillations.

4. A frequency multiplier as claimed in claim 3 and wherein said crystal body is a single crystal of a metal selected from the group including mercury, tin, zinc and thallium.

5. A frequency multiplier as claimed in claim 3 and wherein said crystal body is a single crystal of a semiconductor material selected from the group including indium antimonide and indium arsenide.

6. A frequency multiplier as claimed in claim 3 and wherein said crystal body is a single crystal of a semimetal selected from the group including graphite, bismuth and antimony.

7. A frequency multiplier comprising a crystal body constructed of a material exhibiting magneto-oscillatory behavior at low temperatures, means to apply a constant electric potential across an axis of said crystal body, means to maintain said crystal body at a low temperature, a source of signal energy of given frequency, means connected to said source and arranged to apply a magnetic field varying at said given frequency rate and oriented in a given manner with respect to the crystalline axes of said crystal body across a second axis of said crystal body perpendicular to said first axis thereof, the magnetic field being oriented with respect to the crystalline axes and the limits and mean value of each cyclical swing of the magnetic field being determined by the operation of said last-mentioned means so that a given sequence of Hall effect oscillations occurs during each cyclical swing of the magnetic field, and means for deriving from across the Hall axis of said crystal body an output signal having a frequency equal to said given frequency multiplied by an integral factor, the integral factor depending upon said given sequence of Hall effect oscillations.

8. A frequency multiplier as claimed in claim 7 and wherein said means to apply the magnetic field includes a further means for selectively determining the mean value of each cyclical swing of the magnetic field, said given sequence of the Hall effect oscillations occurring during each cyclical swing of the magnetic field being determined according to the mean value thereof selected.

9. A frequency multiplier comprising a single crystal body constructed of a material exhibiting Hall effect oscillations with a zero mean value in the reciprocal of an applied magnetic field at low temperatures, means to apply a constant electric potential across an axis of said crystal body of an intensity to provide a path for the movement of charge carriers through said crystal in the direction of said potential, means to maintain said crystal body at a low temperature in the order of liquid helium temperatures, means to apply a magnetic field of constant value and oriented in a given manner with respect to the crystalline axes of said crystal body across a second axis of said crystal body perpendicular to said first axis, a source of signal energy of a given frequency, means connected to said source and arranged to vary the magnetic field at said given frequency rate between selected limits of intensity about a mean value corresponding to said constant value of the magnetic field, the magnetic field being oriented with respect to the crystalline axes and the limits and mean value of the cyclical swings of the magnetic field being determined so that a given sequence of the Hall effect oscillations occurs during each cyclical swing of the magnetic field, and means for deriving from across the Hall axis of said crystal body an output signal represented by the Hall voltage having a frequency equal to said given frequency multiplied by an integral factor, the integral factor depending upon said given sequence of Hall effect oscillations.

10. A frequency multiplier as claimed in claim 9, and wherein said means to apply a magnetic field comprises a magnetic core member with an air field in which said crystal is disposed, a field excitation winding on said core, a variable resistor and a source of unidirectional potential connected in series with said winding.

References Cited in the file of this patent

UNITED STATES PATENTS

| | | |
|---|---|---|
| 2,725,474 | Ericsson et al. | Nov. 29, 1955 |
| 2,736,822 | Dunlap | Feb. 28, 1956 |
| 2,830,251 | Tiley | Apr. 8, 1958 |
| 2,862,189 | Kuhrt | Nov. 25, 1958 |
| 2,909,679 | Abraham | Oct. 20, 1959 |